(12) United States Patent
Lin et al.

(10) Patent No.: US 10,834,428 B2
(45) Date of Patent: Nov. 10, 2020

(54) IMAGE CODING AND DECODING METHOD AND DEVICE

(71) Applicants: TONGJI UNIVERSITY, Shanghai (CN); ZTE CORPORATION, Shenzhen (CN)

(72) Inventors: Tao Lin, Shanghai (CN); Ming Li, Shenzhen (CN); Guoqiang Shang, Shenzhen (CN); Zhao Wu, Shenzhen (CN)

(73) Assignees: Tongji University, Shanghai (CN); ZTE Corporation, Shenzhen (CN)

( * ) Notice: Subject to any disclaimer, the term of this patent is extended or adjusted under 35 U.S.C. 154(b) by 114 days.

(21) Appl. No.: 15/507,249

(22) PCT Filed: May 6, 2015

(86) PCT No.: PCT/CN2015/078240
§ 371 (c)(1),
(2) Date: Feb. 28, 2017

(87) PCT Pub. No.: WO2016/172994
PCT Pub. Date: Nov. 3, 2016

(65) Prior Publication Data
US 2018/0242023 A1    Aug. 23, 2018

(30) Foreign Application Priority Data
Apr. 30, 2015 (CN) .......................... 2015 1 0219125

(51) Int. Cl.
*H04N 19/91* (2014.01)
*H04N 19/517* (2014.01)
(Continued)

(52) U.S. Cl.
CPC ........... *H04N 19/91* (2014.11); *H04N 19/157* (2014.11); *H04N 19/182* (2014.11); *H04N 19/517* (2014.11); *H04N 19/593* (2014.11)

(58) Field of Classification Search
None
See application file for complete search history.

(56) References Cited

U.S. PATENT DOCUMENTS

2011/0274169 A1   11/2011  Paz
2015/0264372 A1*   9/2015  Kolesnikov ............ H04N 19/52
                                            375/240.16

FOREIGN PATENT DOCUMENTS

CN          101557514 A       10/2009
CN          102497546 A        6/2012
(Continued)

OTHER PUBLICATIONS

Karczewicz et al., "Non-SCCE1: Block vector coding for Intra block copy", Joint Collaborative Team on video coding (JCT-VC) of ITU-T SG 16 WP 3 and ISO/IEC JTC 1/SC 29/WG11, Document: JCTVC-R0181, 18th Meeting: Sapporo, JP, Jun. 30-Jul. 9, 2014. (Year: 2014).*

(Continued)

*Primary Examiner* — William C Vaughn, Jr.
*Assistant Examiner* — Joseph Daniel A Towe
(74) *Attorney, Agent, or Firm* — Knobbe, Martens, Olson & Bear, LLP

(57) ABSTRACT

An image coding method and apparatus and an image decoding method and apparatus are provided by the present document. The image coding method includes: implementing matching coding for pixels of an input video image to obtain one or more matching relationship parameters, herein the matching relationship parameters are parameters used in a process of constructing predicted values and/or reconstructed values of the pixels in the image; mapping the (Continued)

matching relationship parameters to obtain mapped values of the matching relationship parameters; and performing entropy coding on the mapped values of the matching relationship parameters. The present document addresses the problem existing in the conventional art which is caused by the direct implementation of entropy coding for matching relationship parameters and achieves a good data compression effect through entropy coding.

8 Claims, 11 Drawing Sheets

(51) Int. Cl.
  *H04N 19/593* (2014.01)
  *H04N 19/157* (2014.01)
  *H04N 19/182* (2014.01)

(56) References Cited

FOREIGN PATENT DOCUMENTS

| | | |
|---|---|---|
| JP | 2010166552 A | 7/2010 |
| JP | 2015-507903 A | 3/2015 |
| WO | 2015054812 A1 | 4/2015 |

OTHER PUBLICATIONS

Vivienne Sze et al., IEEE, High Throughput CABAC Entropy Coding in HEVC, IEEE Transactions on Circuits and Systems for Video Technology, VOL22, No. 12, Dec. 2012, XP011487151.

C. Gisquet et al., Canon, AhG 10:palette predictor stuffing, Joint Collaborative Team on Video Coding ; of ITU-T SG 16 WP 3 and ISO/IEC JTC 1/SC 29/WG 11, 17th Meeting: Valencia, ES, Mar. 27-Apr. 4, 2014, XP030115958.
Marta Karczewicz, Qualcomm Technologies Inc., Non-SCCE1:Block vector coding for Intra block copy, Joint Collaborative Team on Video Coding of ITU-T SG 16 WP 3 and ISO/IEC JTC 1/SC 291WG 11, 18th Meeting: Sapporo, JP, Jun. 30- Jul. 9, 2014, XP030116470.
Gary J. Sullivan et al., IEEE, Overview of the High Efficiency Video Coding (HEVC) Standard, IEEE Transactions On Circuits and Systems for Video Technology, vol. 22, No. 12, Dec. 2012, XP055284729.
MediaTek Inc., Shih-Ta Hsiang et al., SCCE1: Test 3.5-Block vector difference coding, Joint Collaborative Team on Video Coding(JCT-VC) of ItU-T SG 16 WP 3 and ISO/TEC JTC 1/SC 29/WG 11, 18th Meeting: Sapporo, JP, Jun. 30-Jul. 9, 2014. JCTVCR0133.
InterDigital Communications, Inc., Chia-Ming Tsai et al., SCCE3: Test B.10—Palette index value mapping, Joint Collaborative Team on Video Coding (JCT-VC) of ITU-T SG 16 WP 3 and ISO/IEC JTC 1/SC 29/WG 11, 18th Sapporo, JP, Jun. 30-Jul. 9, 2014. JCTVC-R0169.
European Patent Office, Office Action dated Jul. 17, 2019 corresponding to EP Application No. 15890374.0.
European Patent Office, Office Action dated Apr. 2, 2020 corresponding to EP Application No. 15890374.0.
Detlev Marpe, et al:"Context-based adaptive binary arithmetic coding in the H.264/AVC video compression standard,", May 21, 2003 (May 21, 2003) XP055382532, DOI: 10.1109/TCSVT.2003. 815173, http://iphome.hhi.de/ wiegand/assets/pdfs/csvt_cabac_0305. pdf.

* cited by examiner

IMAGE CODING AND DECODING METHOD AND DEVICE

TECHNICAL FIELD

The present document relates to compression coding and decoding of digital videos, and in particular to image coding and decoding methods and apparatus.

BACKGROUND

The natural form of digital video signals of images is a sequence of images. Generally, an image is a rectangular region consisting of a plurality of pixels, if 50 images are recorded per second in a digital video signal, then a 30-minute digital video signal is a video image sequence consisting of 90000 images, that is, 30*60*50 images, in some cases, video image sequence is called video sequence or sequence for short. Coding a digital video signal is actually coding images one by one.

According to the latest international video compression standard High Efficiency Video Coding (HEVC), in the coding of an image, the image is divided into a plurality of sub-images of M*M pixels, a sub-image is called a coding Unit (referred to as a CU for short), and the sub-images are coded one by one by taking CU as the basic coding unit. Commonly, the value of M is 4, 8, 16, 32 or 64. Therefore, coding a video image sequence is coding various coding units in various frames successively. Similarly, decoding a video image sequence is also decoding various coding units in various frames successively with the same order, thereby reconstructing the whole video image sequence. HEVC codes an image in a predictive coding way. First, the predicted value of the pixels in an input video image is constructed according to coded image information, and then the difference between the predicted value and the original value of the pixel in the input video image is coded, at the same time, the parameters needed for constructing the predicted value need to be coded. In a decoding process, first, the predicted value of the pixel in an image to be decoded is constructed according to the parameters acquired from a bitstream and decoded image information, and then the sum of the predicted value that may be subjected to a filtering processing and a difference value acquired from the bitstream is used as the reconstructed value of the pixels in the current image to be decoded. It should be noted that a method similar to that in the decoding process also needs to be used in a coding process itself to construct the local decoding reconstructed values of the input video image for constructing prediction references of the predicted values of the pixels in the following input video image.

As each portion of an image is different in content and nature, to achieve the optimal coding performance, the sizes of the CUs in an image may be different, the sizes of some CUs may be 8*8, the sizes of some CUs may be 64*64, and so on. To splice CUs of different sizes seamlessly, an image is always divided into Largest Coding Units (LCUs) with the same size of N*N pixels first, then each LCU is further divided into a plurality of CUs which may be of different sizes. For example, an image is divided into LCUs with the same size of 64×64 pixels first (N=64). One LCU consists of three CUs of 32*32 pixels and four CUs of 16*16 pixels. Another LCU consists of two CUs of 32*32 pixels, three CUs of 16*16 pixels and twenty CUs of 8*8 pixels. Coding an image means successively coding the CUs in successive LCUs. At any moment, the CU which is being coded is referred to as a CU in current coding. Similarly, decoding the image also means successively decoding the CUs in successive LCUs in the same sequence. At any moment, the CU which is being decoded is referred to as a CU in current decoding. A CU in current coding or a CU in current decoding are collectively referred to as a current CU.

A color pixel is consisted of three components. The two pixel color formats that are used most frequently are GBR color format made up of a green component, a blue component and a red component and YUV color format, for example, the YCbCr color format, which is made up of a luma component and two chroma components. Therefore, to code a CU, the CU may be divided into three component planes (planes G, B and R or planes Y, U and V), and then the three component planes are coded separately; alternatively, the three components of a pixel may be bound into a three-component group, and then CUs composed of these three-component groups are coded as a whole. The former arrangement of pixels and the components thereof are referred to as the planar format of an image (and the CUs thereof), and the latter arrangement of pixels and the components thereof are referred to as the packed format of an image (and the CUs thereof).

According to whether chroma components can be downsampled, the YUV color format can further be subdivided into a plurality of types of sub-formats: a YUV4:4:4 pixel color format where one pixel consists of one Y component, one U component and one V component; a YUV4:2:2 pixel color format where a left pixel and an adjacent right pixel consist of two Y components, one U component and one V component; and a YUV4:2:0 pixel color format where the four adjacent pixels that are spatially arranged left-to-right and up-to-down into a 2*2 array consist of four Y components, one U component and one V component. Generally, a component is represented by a numeral composed of 8-16 bits. The YUV4:2:2 pixel color format and the YUV4:2:0 pixel color format are both obtained by performing a chroma component downsampling operation on the YUV4:4:4 pixel color format. A pixel component is also referred to as a pixel sample or a sample for short.

In the application of the present document, pixel and pixel sample value are both referred to as pixel value, that is, a 'pixel value' refers to a 'pixel' or a 'pixel sample value'.

A reconstructed pixel value is generated when any CU is coded or decoded, the reconstructed pixel value is further classified into a partially reconstructed pixel value generated from a different degree of partial reconstruction during a coding or decoding process and a completely reconstructed pixel value that is generated after completing the coding or decoding. If there is a completely reconstructed pixel value equal to an originally input pixel value before the coding, then the coding and decoding process is called lossless coding and decoding. If a completely reconstructed pixel value is different from the originally input pixel value before the coding, then the coding and decoding process is called lossy coding and decoding. The reconstructed pixel values generated during the process of coding or decoding CUs in succession are usually stored as history data used as reference pixel values for subsequent CU coding or decoding. A storage space for storing reconstructed pixel history data is called a temporary space or temporary buffer for reference pixel values or a reference pixel value set. The temporary space for reference pixel values is a limited space only for storing a part of history data. The history data stored in the temporary space for reference pixel values may also include the reconstructed pixel value of the current CU.

With the development and popularization of the new generation of cloud computing and information processing modes and platforms which are typically represented by remote desktop, the interconnection among a plurality of computers, the interconnection among a computer host, a smart TV, a smart phone, a tablet personal computer and other digital devices, and the interconnection among a variety of digital devices have come true and generally become the dominant trend. Thus, the real-time screen transmission between a server side (cloud) and a user side is needed urgently at present. Because the quantity of the screen video data to be transmitted is very huge, computer screen images must be subjected to a high-efficiency high-quality data compression.

One of the main goals of the latest international video compression standard HEVC is to make the best use of the characteristics of computer screen images to compress computer screen images highly efficiently.

A remarkable characteristic of computer screen image is the typical inclusion of many similar or even identical pixel patterns in an image. For example, Chinese or foreign language words that are often seen in a computer screen image are all composed of several basic strokes, many similar or identical strokes can be found in the same image. For the menus and icons in a computer screen image, there are also many similar or identical patterns. In the intra prediction mode adopted by existing image and video compression technologies, only referencing adjacent pixel values makes it impossible to improve compression efficiency by utilizing the similarity or the identity of the patterns existing in the same image. Thus, the HEVC working committee is studying and planning a plurality of matching modes for improving compression performance significantly by fully exploring and utilizing the similar or identical patterns existing in computer screen images. The plurality of matching modes include intra block matching (also called intra block copy), micro block matching, fine division matching, string matching, micro block string matching, color palette-index matching, 2-dimensional shape-preserving matching, quadtree matching and arbitrary shape and area copy matching etc. In each of these matching modes, a matching relationship is represented with several basic matching relationship parameters which may be, for example, matching position and matching size. Herein matching position represents a position of matching reference pixel values matched with the pixel values in current coding (or decoding) (collectively referred to as currently matched pixel values) in a reference pixel value set composed of reconstructed pixels, and matching size represents the number of the currently matched pixel values. Obviously, the number of the currently matched pixel values is equal to that of matching reference pixel values.

Matching position is a relative position between matching reference pixel values and the currently matched pixel values. In an image, the position of matching reference pixel values can be represented by two-dimensional coordinates or a linear address, and the position of the currently matched pixel values can also be represented by two-dimensional coordinates or a linear address. Thus, a matching position can be represented by the differences between the two-dimensional coordinates of a matching reference pixel values and the two-dimensional coordinates of the currently matched pixel values or the difference between the linear address of matching reference pixel values and the linear address of the currently matched pixel values, the difference is also called "displacement vector". In the case of the use of two-dimensional coordinates, a matching position, that is, a displacement vector, is represented by two matching relationship parameters, that is, two vector components, for example, a horizontal vector component and a vertical component. In the case of the use of a linear address, a matching position, that is, a displacement vector, is represented by a matching relationship parameter, that is, the difference of two linear addresses, which is generally called "matching distance".

Matching size represents the total number of the currently matched pixel values having the same matching position. Because the number of the currently matched pixel values is equal to that of matching reference pixel values, matching size also represents the total number of the matching reference pixel values with the same matching position. In some matching modes, matching size is a matching relationship parameter, for example, the length of a matched string or the numbers of a plurality of preset matching shapes and sizes (e.g. 4×4 square blocks with pixel values, 4×8 blocks with pixel values, 8×8 square blocks with pixel values and 16×16 square blocks with pixel values). In some matching modes, matching size may be several matching relationship parameters, for example, two matching relationship parameters, that is, heights and widths of a matching rectangle, or three matching relationship parameters, that is, height of a matching right trapezoid and widths of the upper side and the lower side of the matching right trapezoid, or three matching relationship parameters equivalent to the foregoing three parameters, I matching relationship parameters representing lengths of I horizontal lines constituting a matching region.

The value range of a matching relationship parameter is a preset finite element set in which numerals are arranged in a certain order, commonly, a set of integers arranged in ascending order. For example, the value range of a matching relationship parameter representing the difference between linear addresses of matching positions (usually called a matching distance) is from 1 to D (D=1048576), where D represents the maximum allowable matching distance. For another example, the value range of a matching relationship parameter representing the length of a matched string is from 1 to L (L=12288), where L represents the maximum allowable length of a matched string.

Two or three or more matching relationship parameters may also be combined into one matching relationship parameter by conducting some operations. The matching relationship parameter resulting from the combination has a wider value range.

Data compression must be performed on matching relationship parameters through entropy coding. The input of entropy coding is integers within a preset value range. Entropy coding is divided into two steps: 1) binarizing an input integer, that is, converting an integer into a string of bins, herein each bin is 0 or 1; and 2) performing context-based adaptive binary arithmetic coding on each bin.

The binarization methods used in related technologies all have a feature that, a relatively smaller quantity of data generated from entropy coding is written into a compressed bitstream because a relatively smaller integer is converted into a relatively shorter string of bins after binarization, while a relatively bigger quantity of data generated from entropy coding is written into a compressed bitstream because a relatively bigger integer is converted into a relatively longer string of bins after being binarized.

Because of this feature of binarization methods, if there is an overall trend that the larger an integer included in the value range of a matching relationship parameter is, the less the integer appears in the whole coding process, then entropy coding will achieve a good data compression performance. Contrarily, if the frequency of the appearance of an integer included in the value range of a matching relationship parameter gets higher and lower and repeatedly oscillates as the value of the matching relationship parameter becomes larger, then the data compression performance of entropy coding is impacted negatively.

In many cases, the frequency of the appearance of any integer in the value range of a matching relationship parameter in the whole coding process is not always reduced as the value of the integer increases, an appearance frequency p(A) of a certain integer A may be quite greater than an appearance frequency p(B) of another integer B which is much smaller than A, that is, A is much greater than B while p(A) is much greater than p(B), as a result, a feature that the frequency becomes higher and lower and repeatedly oscillates as a value of an integer increases, appears.

In existing technologies, directly applying entropy coding to matching relationship parameters would usually lead to the following problem that one special integer value of a matching relationship parameter appears highly frequently but is of a great value and thus a large number of bitstream data will be generated by applying entropy coding to this special integer value.

No effective solutions have been proposed to address the problem existing in the conventional art which is caused by the direct implementation of entropy coding for a matching relationship parameter.

SUMMARY

The present document provides an image coding and decoding method and apparatus to at least address the problem existing in the conventional art which is caused by the direct implementation of entropy coding for a matching relationship parameter.

In accordance with an aspect of the present document, an image coding apparatus is provided which includes the following modules: a module 1): a pixel preprocessing and matching coding module arranged to perform pixel preprocessing and matching coding on pixel values of an input video image to generate and output one or more matching relationship parameters and other matching coding result except the one or more matching relationship parameters; a module 2): a mapping module arranged to perform one-to-one mapping on a value range of the matching relationship parameters, herein input of the mapping is the matching relationship parameters output by the module 1), and output of the mapping is the mapped matching relationship parameters; a module 3): a coding and reconstructing module arranged to perform coding and reconstruction operations on the input video image, the matching relationship parameters and variables; a module 4): a temporary storage module arranged to temporarily store pixel values in a reconstructed reference pixel value set; and a module 5): an entropy coding module arranged to perform entropy coding operations on all coding results that need to be output to a compressed bitstream and include the mapped matching relationship parameters and other coding result, and output a result of the entropy coding, herein the result of the entropy coding includes compressed data of the matching relationship parameters and a compressed bitstream of the other coding result.

In an exemplary embodiment, the value range is divided into K subordinate value ranges, and accordingly, the mapping is also divided into mappings in the K subordinate value ranges.

In an exemplary embodiment, the value range is divided into L groups of subordinate value ranges, each subordinate value range in each group of subordinate value ranges includes equal finite elements, accordingly, the mapping is also divided into L groups of mappings; through each group of mappings, a complete subordinate value range in a group of subordinate value ranges is mapped into a complete subordinate value range in the same group while keeping a sequence of all elements in the subordinate value range unchanged, herein L is a natural number.

In an exemplary embodiment, one of the mappings in the value range or the subordinate value range is consisted of a plurality of partial mappings that are implemented successively.

In an exemplary embodiment, mapping relationships for one of the mappings or partial mappings in the value range or the subordinate value range are represented in one of the following ways: the mapping relationships are all represented by one computation expression or a group of computation expressions; the mapping relationships are all represented by a list; a part of the mapping relationships are represented by one computation expression or a group of computation expressions while others are represented by a list.

In an exemplary embodiment, a mapping relationship for one of the mappings or partial mappings in the value range or the subordinate value range changes as status and/or parameters of current coding change.

In an exemplary embodiment, a mapping relationship for one of the mappings or partial mappings in the value range or the subordinate value range changes as a width of a current coding block changes.

In an exemplary embodiment, one of the matching relationship parameters is a matching distance, and the width W of the current coding block has four values: 64, 32, 16 and 8, and accordingly, the mapping has four mapping relationships.

In an exemplary embodiment, the apparatus further includes: a real-time statistic module arranged to make real-time statistics on characteristics of various numerical values in the value range of the matching relationship parameters and dynamically adjust a mapping relationship of the mapping or partial mapping according to a result of the real-time statistics on various numerical values of the matching relationship parameters.

In accordance with another aspect of the present document, an image decoding apparatus is also provided which includes the following modules: a module 1): an entropy decoding module arranged to perform entropy decoding on an input compressed bitstream including compressed data of matching relationship parameters and other coding result except the compressed data of the matching relationship parameters, and parse various data obtained from the entropy decoding; a module 2): an inverse mapping module arranged to perform one-to-one inverse mapping on a value range of mapped matching relationship parameters, herein through the inverse mapping, matching relationship parameters before the mapping is restored and output; a module 3): a matching decoding module arranged to perform matching decoding operations according to the matching relationship parameters; a module 4): a decoding and reconstructing module arranged to perform decoding and reconstruction operations on various parameters and variables in a matching region in current decoding or a decoding block in current decoding; and a module 5): a temporary storage module arranged to temporarily store pixel values in a reconstructed reference pixel value set.

In an exemplary embodiment, the matching region is a matching string or a matching block.

In an exemplary embodiment, the value range is divided into K subordinate value ranges, and accordingly, the inverse mapping is also divided into inverse mappings in the K subordinate value ranges.

In an exemplary embodiment, the value range is divided into L groups of subordinate value ranges, each subordinate value range in each group of subordinate value range includes equal finite elements, accordingly, the inverse mapping is also divided into L groups of inverse mappings; through a group of inverse mappings, a complete subordinate value range in a group of subordinate value ranges is inversely mapped into a complete subordinate value range in the same group while keeping a sequence of all elements in the subordinate value range unchanged, herein L is a natural number.

In an exemplary embodiment, one of the mappings or the inverse mappings in the value range or the subordinate value range is consisted of a plurality of partial mappings or partial inverse mappings that are implemented successively.

In an exemplary embodiment, inverse mapping relationships for one of the inverse mappings or partial inverse mappings in the value range or the subordinate value range are represented in one of the following ways: the inverse mapping relationships are all represented by one computation expression or a group of computation expressions; the inverse mapping relationships are all represented by a list; a part of the inverse mapping relationships are represented by one computation expression or a group of computation expressions while others are represented by a list.

In an exemplary embodiment, an inverse mapping relationship for one of the inverse mappings or partial inverse mappings in the value range or the subordinate value range changes as status and/or parameters of current coding change.

In an exemplary embodiment, an inverse mapping relationship for one of the inverse mappings or partial inverse mappings in the value range or the subordinate value range changes as a width of the decoding block changes.

In an exemplary embodiment, one of the matching relationship parameters is a matching distance, the width W of the decoding block has four values: 64, 32, 16 and 8, and accordingly, the inverse mapping has four inverse mapping relationships.

In an exemplary embodiment, the apparatus further includes: a real-time statistic module arranged to make real-time statistics on characteristics of various numerical values in the value range of the matching relationship parameters and dynamically adjust an inverse mapping relationship of the inverse mapping or partial inverse mapping according to a result of the real-time statistics on various numerical values of the matching relationship parameters.

In accordance with an aspect of the present document, an image coding method is provided which includes: performing pixel preprocessing and matching coding on pixel values of an input video image to generate and output one or more matching relationship parameters; performing one-to-one mapping on a value range of the matching relationship parameters and outputting the mapped matching relationship parameters; performing coding and reconstruction operations on the input video image, the matching relationship parameters and variables; temporarily storing pixel values in a reconstructed reference pixel value set; and performing entropy coding on the mapped matching relationship parameters and outputting a result of the entropy coding.

In accordance with another aspect of the present document, an image decoding method is also provided which includes: performing entropy decoding on an input compressed bitstream including compressed data of matching relationship parameters and other parameters except the compressed data of the matching relationship parameters; performing one-to-one inverse mapping on a value range of mapped matching relationship parameters to restore and output a matching relationship parameters before the mapping; performing matching decoding according to the matching relationship parameters; performing decoding and reconstruction operations on various parameters and variables in a matching region in current decoding or a decoding block in current decoding; and temporarily storing pixel values in a reconstructed reference pixel value set.

In accordance with an aspect of the present document, an image coding method is provided which includes: performing matching coding on pixels of an input video image to obtain one or more matching relationship parameters, herein the matching relationship parameters are parameters used in a process of constructing predicted values and/or reconstructed values of the pixels in the input video image; mapping the matching relationship parameters to obtain mapped values of the matching relationship parameters; and performing entropy coding on the mapped value of the matching relationship parameters.

In an exemplary embodiment, mapping the matching relationship parameters includes: converting, according to existing matching relationship parameters, matching relationship parameters to be matched, and taking values obtained after the conversion as the mapped values of the relationship parameters to be matched; and/or assembling and/or rearranging matching relationship parameters of a same type into a matching relationship parameter group according to a specific rule, mapping the matching relationship parameter group, and taking the matching relationship parameter group obtained after the mapping as the mapped values of the matching relationship parameters.

In an exemplary embodiment, the specific rule includes at least one of the following rules: a preset rule; and an operation which is set according to a value of the existing matching relationship parameter for assembling and/or rearranging a plurality of relationship parameters to be matched.

In an exemplary embodiment, mapping the matching relationship parameter group includes: taking values of the matching relationship parameters in the matching relationship parameter group as an output of the mapping; and/or taking values obtained after converting the values of the matching relationship parameters in the matching relationship parameter group as an output of the mapping.

In accordance with another aspect of the present document, an image decoding method is provided which includes: performing entropy decoding on a received bitstream to obtain values of fields for indicating matching relationship parameters, herein the matching relationship parameters are parameters used in a process of constructing predicted values and/or reconstructed values of the pixels in a video image to be decoded; mapping the values of the fields to obtain mapped matching relationship parameters; and constructing the predicted values and/or the reconstructed values of the pixels in the video image to be decoded according to the mapped matching relationship parameters.

In an exemplary embodiment, mapping the values of the fields to obtain mapped matching relationship parameters includes: converting, according to the obtained matching relationship parameters, the values of the fields to be processed, and taking values obtained after the conversion as the mapped matching relationship parameters; and/or assembling and/or rearranging the values of the fields to be processed of a same type into an array according to a specific rule, and processing the array as the mapped matching relationship parameters.

In an exemplary embodiment, the specific rule includes at least one of the following rules: a preset rule; and an operation which is set according to the obtained values of the fields for the assembly and/or rearrangement the values of the fields to be processed.

In an exemplary embodiment, processing the array includes: taking values of the fields to be processed in the array as output values after processing; and/or taking values obtained after converting the values of the fields to be processed in the array as output values after processing.

In accordance with an aspect of the present document, an image coding apparatus is provided which includes: a matching coding module arranged to perform matching coding on pixels of an input video image to obtain one or more matching relationship parameters, herein the matching relationship parameters are parameters used in a process of constructing predicted values and/or reconstructed values of the pixels in the input video image; a mapping module arranged to map the matching relationship parameters to obtain mapped values of the matching relationship parameters; and an entropy coding module arranged to perform entropy coding on the mapped values of the matching relationship parameters.

In accordance with another aspect of the present document, an image decoding apparatus is also provided which includes: an entropy decoding module arranged to perform entropy decoding on a received bitstream to obtain values of fields for indicating matching relationship parameters, herein the matching relationship parameters are parameters used in a process of constructing predicted values and/or reconstructed values of pixels in a video image to be decoded; a mapping module arranged to map the values of the fields to obtain mapped matching relationship parameters; and a construction module arranged to construct the predicted values and/or the reconstructed values of the pixels in the video image to be decoded according to the mapped matching relationship parameters.

With the present document, by implementing matching coding for the pixels of an input video image, one or more matching relationship parameters are obtained, herein the matching relationship parameters are parameters used in the process of constructing the predicted values and/or the reconstructed values of the pixels in the image, the matching relationship parameters are mapped to obtain the mapped values of the matching relationship parameters, and entropy coding is performed on the mapped values of the matching relationship parameters, it is to address the problem existing in the conventional art which is caused by directly performing entropy coding on matching relationship parameters, thus achieving a good data compression performance through entropy coding.

BRIEF DESCRIPTION OF DRAWINGS

The accompanying drawings described herein which form a part of the application are provided for the further understanding of the present document, and exemplary embodiments of the present document and the description of the exemplary embodiments serve to illustrate the present document but are not to be construed as improper limitations to the present document. In the accompanying drawings.

DETAILED DESCRIPTION

The present document will be described below in detail with reference to accompanying drawings and in conjunction with specific embodiments. It should be noted that the embodiments of the present application and the features thereof can be combined with each other in case of no conflict.

Figure 1:
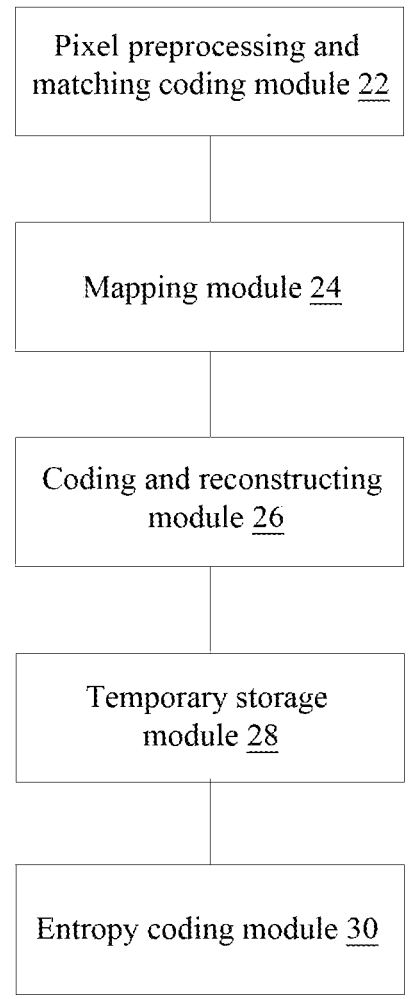
FIG. 1 is a block diagram illustrating the structure of an image coding apparatus according to an embodiment of the present document.

FIG. 1 is a block diagram illustrating the structure of an image coding apparatus according to an embodiment of the present document. As shown in FIG. 1, the image coding apparatus includes: a module 1): a pixel preprocessing and matching coding module 22 arranged to perform pixel preprocessing and matching coding on pixel values of an input video image to generate and output one or more matching relationship parameters and other matching coding result except the one or more matching relationship parameters; a module 2): a mapping module 24 arranged to perform one-to-one mapping on value ranges of the matching relationship parameters, herein input of the mapping is the matching relationship parameters output by the module 1), and output of the mapping is the mapped matching relationship parameters; a module 3): a coding and reconstructing module 26 arranged to perform coding and reconstruction operations on the input video image, the matching relationship parameters and variables; a module 4): a temporary storage module 28 arranged to temporarily store pixel values in a reconstructed reference pixel value set; and a module 5): an entropy coding module 30 arranged to perform entropy coding operations on all coding results that need to be output to compressed bitstream and include the mapped matching relationship parameters and the other coding result, and output a result of the entropy coding, herein the result of the entropy coding includes compressed data of the matching relationship parameters and a compressed bitstream of the other coding result.

With the foregoing image coding apparatus, after mapping matching relationship parameters, the mapped matching relationship parameters are coded, compared with the conventional art in which the direct implementation of entropy coding for matching relationship parameters leads to a problem that a great number of compressed bitstream data are generated after entropy coding is performed because a certain integer of the matching relationship parameters is large and appears highly frequently, the foregoing image coding apparatus solves the problem caused by the direct implementation of entropy coding for matching relationship parameters in the existing technology and further achieves a good data compression performance through entropy coding.

In an alternative embodiment, the value range is divided into K subordinate value ranges, and accordingly, the mapping is also divided into mappings in the K subordinate value ranges.

In another alternative embodiment, the value range is divided into L groups of subordinate value ranges, each subordinate value range in each group of subordinate value ranges includes equal finite elements, accordingly, the mapping is also divided into L groups of mappings; through a group of mappings, a complete subordinate value range in a group of subordinate value ranges is mapped into a complete subordinate value range in the same group while keeping a sequence of all elements in the subordinate value range unchanged, herein L is a natural number.

In an alternative embodiment, a mapping in the value range or the subordinate value range is consisted of a plurality of partial mappings that are implemented successively.

The mapping relationships for one of the mappings or partial mappings in the value range or the subordinate value range may be represented in a plurality of ways which will be exemplified below. In an alternative embodiment, the mapping relationships are represented in one of the following ways: the mapping relationships are all represented by one computation expression or a group of computation expressions; the mapping relationships are all represented by a list; a part of the mapping relationships are represented by one computation expression or a group of computation expressions while the others are represented by a list.

In an alternative embodiment, a mapping relationship for one of the mappings or partial mappings in the value range or the subordinate value range changes as status and/or parameters of current coding change.

In another alternative embodiment, a mapping relationship for one of the mappings or partial mappings in the value range or the subordinate value range changes as a width of a current coding block changes.

There are a plurality of kinds of matching relationship parameters, in the case where the matching relationship parameter is a matching distance, in an alternative embodiment, the width W of the current coding block has four values: 64, 32, 16 and 8, and accordingly, the mapping has four mapping relationships.

Figure 2:
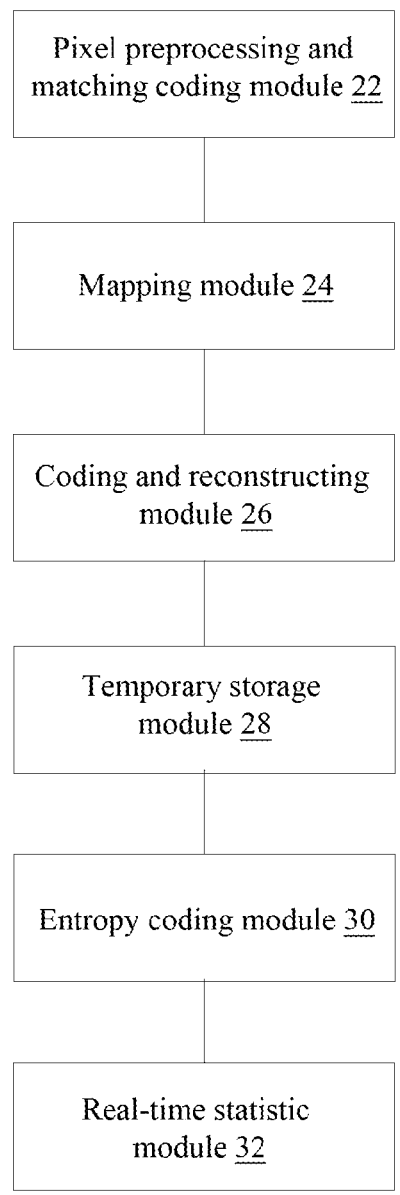
FIG. 2 is a block diagram (1) illustrating the structure of an image coding apparatus according to an embodiment of the present document.

FIG. 2 is a block diagram (1) illustrating the structure of an image coding apparatus according to an embodiment of the present document. As shown in FIG. 2, the apparatus further includes: a real-time statistic module 32 arranged to make real-time statistics on characteristics of various numerical values in the value range of the matching relationship parameters and dynamically adjust a mapping relationship of the mapping or partial mapping according to a result of the real-time statistics on various numerical values of the matching relationship parameters.

Figure 3:
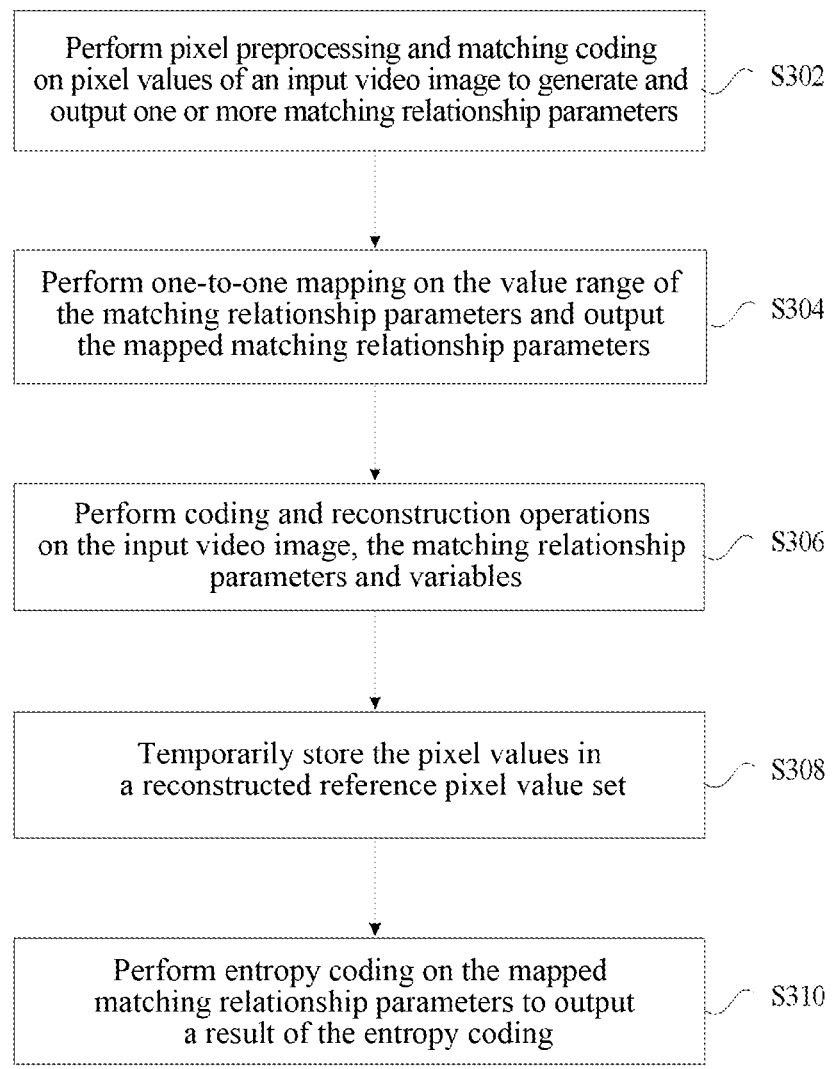
FIG. 3 is a flowchart illustrating an image coding method according to an embodiment of the present document.

In another embodiment, an image coding method is provided, FIG. 3 is a flowchart illustrating an image coding method according to an embodiment of the present document, and as shown in FIG. 3, the flow includes the following steps.

In Step S302, pixel preprocessing and matching coding are performed on pixel values of an input video image to generate and output one or more matching relationship parameters.

In Step S304, one-to-one mapping is performed on the value range of the matching relationship parameters, and the mapped matching relationship parameters are output.

In Step S306, coding and reconstruction operations are performed on the input video image, the matching relationship parameters and variables.

In Step S308, the pixel values in a reconstructed reference pixel value set are stored temporarily.

In Step S310, entropy coding is performed on the mapped matching relationship parameters to output a result of the entropy coding.

By executing the foregoing steps, after mapping matching relationship parameters and coding the mapped matching relationship parameters, compared with the conventional art in which the direct implementation of entropy coding for a matching relationship parameter leads to a problem that a great number of compressed bitstream data are generated after entropy coding is performed because a certain integer of the matching relationship parameter is very large and appears highly frequently, the foregoing image coding apparatus solves the problem caused by the direct implementation of entropy coding for matching relationship parameters in the conventional art and achieves a good data compression performance through entropy coding.

Figure 4:
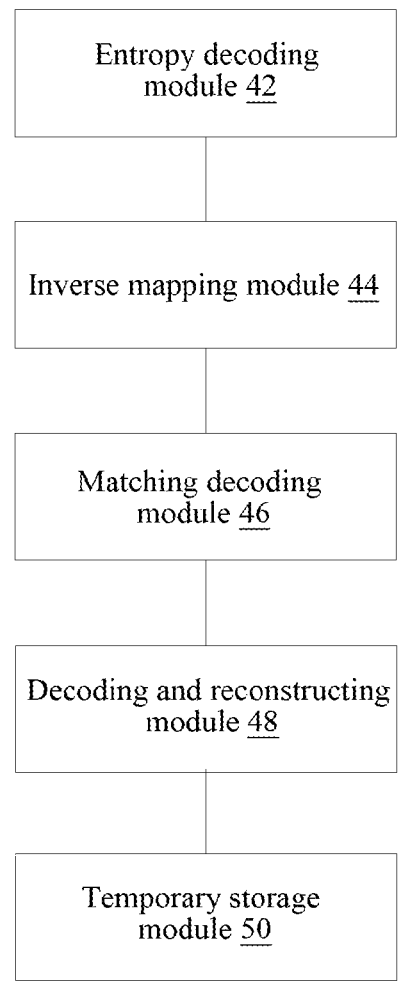
FIG. 4 is a block diagram illustrating the structure of an image decoding apparatus according to an embodiment of the present document.

FIG. 4 is a block diagram illustrating the structure of an image decoding apparatus according to an embodiment of the present document. As shown in FIG. 4, the apparatus includes the following modules: a module 1): an entropy decoding module 42 arranged to perform entropy decoding on an input compressed bitstream including compressed data of matching relationship parameters and other coding result except the compressed data of the matching relationship parameters, and parse various data obtained from the entropy decoding; a module 2): an inverse mapping module 44 arranged to perform one-to-one inverse mapping on a value range of mapped matching relationship parameters, herein through the inverse mapping, matching relationship parameters before the mapping are restored and output; a module 3): a matching decoding module 46 arranged to perform matching decoding operations according to the matching relationship parameters; a module 4): a decoding and reconstructing module 48 arranged to perform decoding and reconstruction operations on various parameters and variables in a matching region in current decoding or a decoding block in current decoding; and a module 5): a temporary storage module 50 arranged to temporarily store pixel values in a reconstructed reference pixel value set.

By inversely mapping the value range of mapped matching relationship parameters obtained from an entropy coding process to output matching relationship parameters before the mapping, the foregoing image decoding apparatus addresses the problem existing in the conventional art which is caused by the direct implementation of entropy coding for matching relationship parameters and achieves a good data compression performance through entropy coding.

In an alternative embodiment, the matching region is a matching string or a matching block.

In an alternative embodiment, the value range is divided into K subordinate value ranges, and accordingly, the inverse mapping is also divided into inverse mappings in the K subordinate value ranges.

In another alternative embodiment, the value range is divided into L groups of subordinate value ranges, each subordinate value range in each group of subordinate value ranges includes equal finite elements, accordingly, the inverse mapping is also divided into L groups of inverse mappings; through a group of inverse mappings, a complete subordinate value range in a group of subordinate value ranges is inversely mapped into a complete subordinate value range in the same group while keeping a sequence of all elements in the subordinate value range unchanged, herein L is a natural number.

In another alternative embodiment, one of the mappings or the inverse mappings in the value range or the subordinate value range is consisted of a plurality of partial mappings or partial inverse mappings that are implemented successively.

Alternatively, inverse mapping relationships for one of the inverse mappings or partial inverse mappings in the value range or the subordinate value range can be represented in a plurality of ways, and in an alternative embodiment, the inverse mapping relationships are represented in one of the following ways: the inverse mapping relationships are all represented by one computation expression or a group of computation expressions; the inverse mapping relationships are all represented by a list; a part of the inverse mapping relationships are represented by one computation expression or a group of computation expressions while the others are represented by a list.

In an alternative embodiment, an inverse mapping relationship for one of the inverse mappings or partial inverse mappings in the value range or the subordinate value range changes as status and/or parameters of current coding change.

In another alternative embodiment, an inverse mapping relationship for one of the inverse mappings or partial inverse mappings in the value range or the subordinate value range changes as a width of the decoding block changes.

The matching relationship parameter may be various kinds of information, in the case where the matching relationship parameter is a matching distance, in an alternative embodiment, the width W of the decoding block has four values: 64, 32, 16 and 8, and accordingly, the inverse mapping has four inverse mapping relationships.

Figure 5:
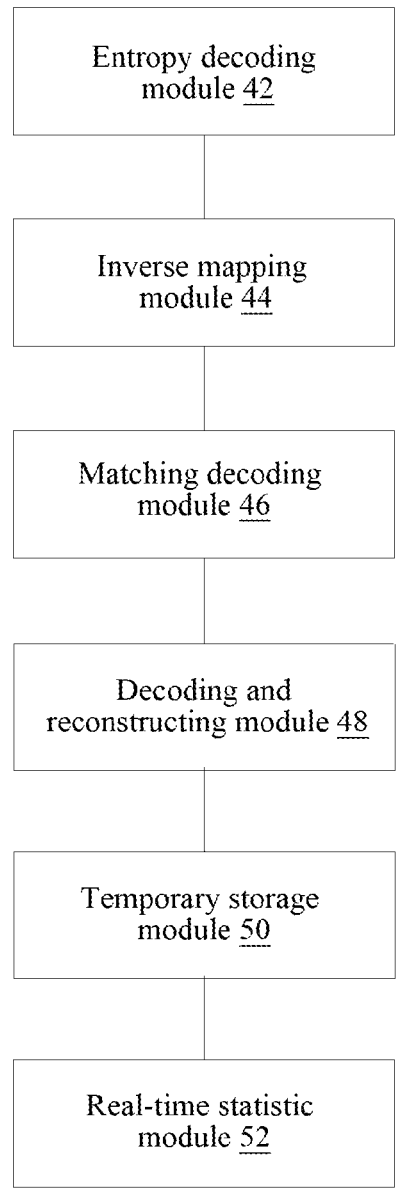
FIG. 5 is a block diagram (1) illustrating the structure of an image decoding apparatus according to an embodiment of the present document.

FIG. 5 is a block diagram (1) illustrating the structure of an image decoding apparatus according to an embodiment of the present document. As shown in FIG. 5, the apparatus further includes: a real-time statistic module 52 arranged to make real-time statistics on characteristics of various numerical values in the value range of the matching relationship parameters and dynamically adjust an inverse mapping relationship of the inverse mapping or partial inverse mapping according to a result of the real-time statistics on various numerical values of the matching relationship parameters.

Figure 6:
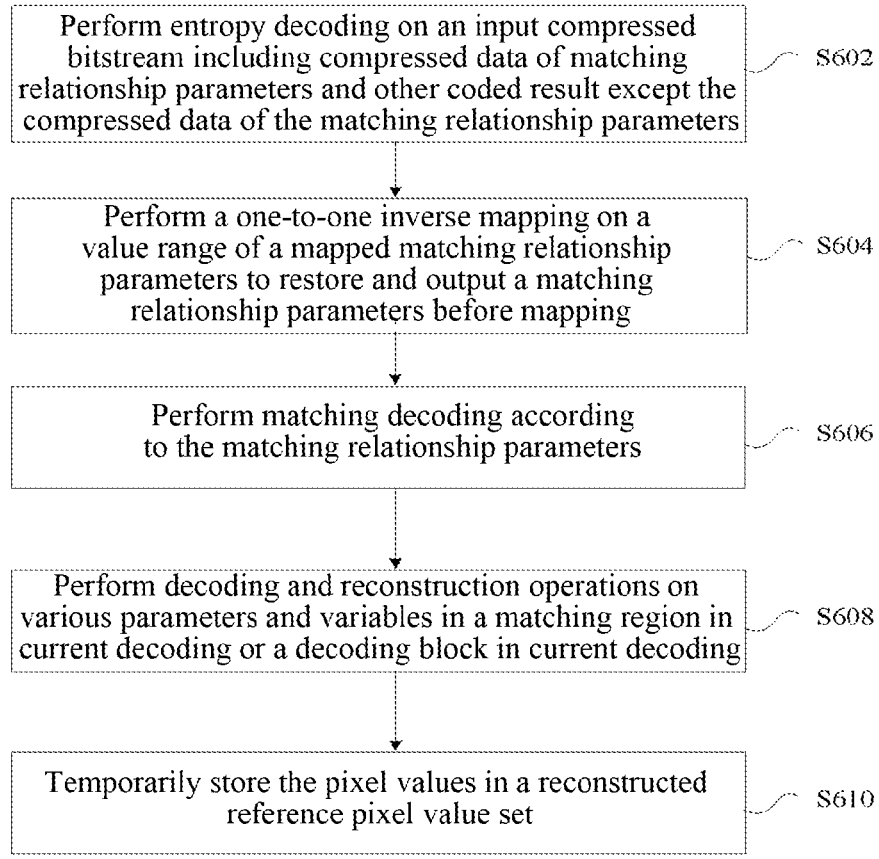
FIG. 6 is a flowchart illustrating an image decoding method according to an embodiment of the present document.

In another embodiment, an image coding method is provided, FIG. 6 is a flowchart illustrating an image decoding method according to an embodiment of the present document, and as shown in FIG. 6, the flow includes the following steps.

In Step S602, entropy decoding is performed on an input compressed bitstream including compressed data of matching relationship parameters and other parameters except the compressed data of the matching relationship parameters.

In Step S604, a one-to-one inverse mapping is performed on a value range of mapped matching relationship parameters obtained from entropy decoding to restore and output matching relationship parameters before the mapping.

In Step S606, matching decoding is performed according to the matching relationship parameters.

In Step S608, decoding and reconstruction operations are performed on various parameters and variables in a matching region in current decoding or a decoding block in current decoding.

In Step S610, pixel values in a reconstructed reference pixel value set are stored temporarily.

By executing the foregoing steps, it is to inversely map the value range of a mapped matching relationship parameter obtained from an entropy coding process, to output a matching relationship parameter before the mapping, it is to address the problem existing in the conventional art which is caused by the direct implementation of entropy coding for matching relationship parameters and achieve a good data compression performance through entropy coding.

Figure 7:
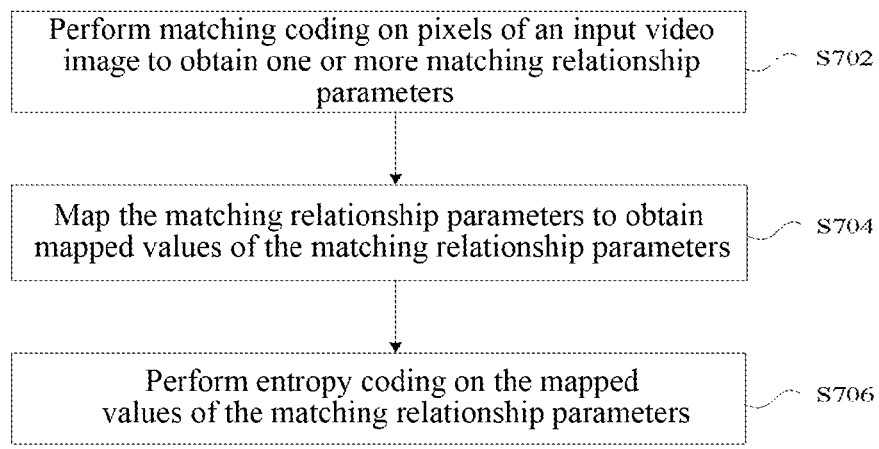
FIG. 7 is a flowchart (1) illustrating an image coding method according to an embodiment of the present document.

In another embodiment, an image coding method is provided, FIG. 7 is a flowchart (1) illustrating an image coding method according to an embodiment of the present document. As shown in FIG. 7, the flow includes the following steps.

In Step S702, matching coding is performed on pixels of an input video image to obtain one or more matching relationship parameters, herein the matching relationship parameters are parameters used in a process of constructing predicted values and/or reconstructed values of the pixels in the input video image.

In Step S704, the matching relationship parameters are mapped to obtain a mapped value of the matching relationship parameters.

In Step S706, entropy coding is performed on the mapped values of the matching relationship parameters.

By the foregoing steps of mapping matching relationship parameters and coding the mapped matching relationship parameters, compared with the conventional art in which the direct implementation of coding for a matching relationship parameter leads to a problem that a great number of compressed bitstream data are generated after entropy coding is performed because a certain integer of the matching relationship parameter is very large and appears highly frequently, it is to solve the problem caused by the direct implementation of entropy coding for matching relationship parameters in the conventional art and achieve a good data compression performance through entropy coding.

In an alternative embodiment, the frequency of the mapped value of a matching relationship parameter reduces as the mapped value of the matching relationship parameter increases, herein the frequency indicates that the greater the mapped value is, the lower the probability of the actual appearance of the mapped value is, that is, the less the mapped value appears.

In an alternative embodiment, mapping is performed on the matching relationship parameters in Step S704, it is to convert, according to existing matching relationship parameters, relationship parameters to be matched, and take values obtained after converting as the mapped values of the relationship parameters to be matched, herein the mapping operation may be appreciated as a direct 'copy' operation, that is, no processing is performed on the input data. And/or, it is to assembly and/or rearrange matching relationship parameters of the same type into a matching relationship parameter group according to a specific rule, map the matching relationship parameter group, and take the matching relationship parameter group obtained from the mapping as the mapped values of the matching relationship parameters. In this way, the mapping of a matching relationship parameters is realized.

The above specific rule may include a plurality of kinds of specific rules which will be exemplified below. In an alternative embodiment, the specific rule may be a preset rule or an operation which is set according to the values of the existing matching relationship parameters for assembling and/or rearranging a plurality of relationship parameters to be matched.

The foregoing matching relationship parameter group can be mapped by using a plurality of methods which will be exemplified below. In an alternative embodiment, the processing method can be taking the values of the matching relationship parameters in the matching relationship parameter group as the output of the mapping, or taking the values of the matching relationship parameters in the matching relationship parameter group obtained from the conversion as the output of the mapping.

An image coding apparatus is also provided in the embodiment to realize the foregoing embodiments and preferred implementations, and what has been described above is not described here repeatedly. The term 'module', as used hereinafter, is the combination of software and/or hardware for realizing predetermined functions. Although the apparatuses described in the following embodiments are implemented as software preferably, the implementation of the apparatuses as hardware or combination of software and hardware may also be conceived.

Figure 8:
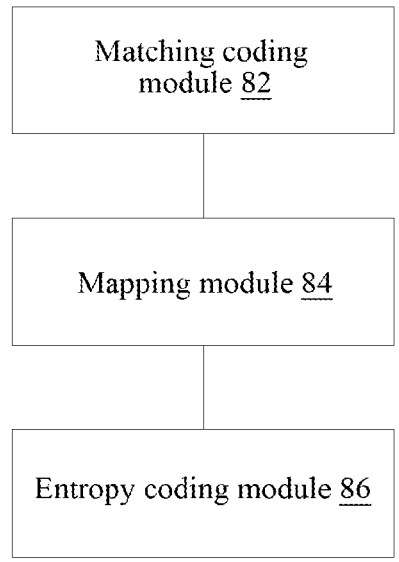
FIG. 8 is a block diagram (2) illustrating the structure of an image coding apparatus according to an embodiment of the present document.

FIG. 8 is a block diagram (2) illustrating the structure of an image coding apparatus according to an embodiment of the present document. As shown in FIG. 8, the apparatus includes: a matching coding module 82 arranged to perform matching coding on pixels of an input video image to obtain one or more matching relationship parameters, herein the matching relationship parameters are parameters used in a process of constructing predicted values and/or reconstructed values of the pixels in the input video image; a mapping module 84 arranged to map the matching relationship parameters to obtain mapped values of the matching relationship parameters; and an entropy coding module 86 arranged to perform entropy coding on the mapped values of the matching relationship parameters.

Figure 9:
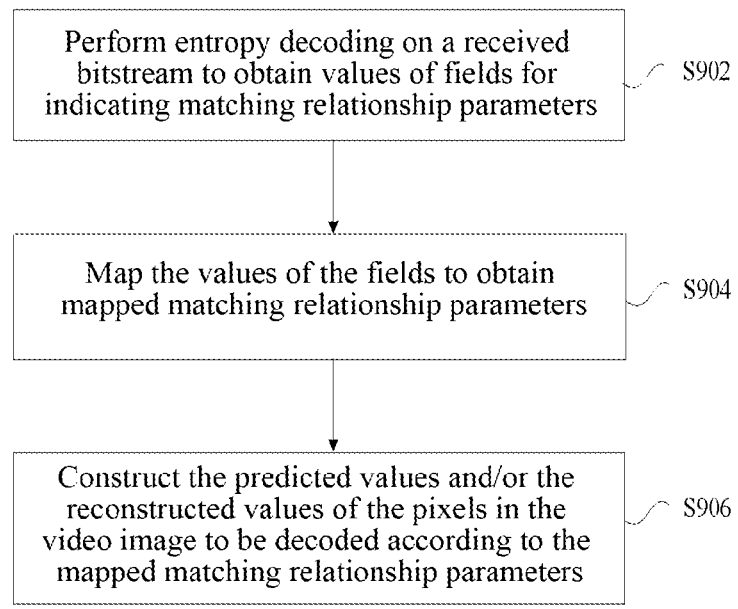
FIG. 9 is a flowchart (1) illustrating an image decoding method according to an embodiment of the present document.

In another embodiment, an image decoding method is provided, FIG. 9 is a flowchart (1) illustrating an image decoding method according to an embodiment of the present document. As shown in FIG. 9, the flow includes the following steps.

In Step S902, entropy decoding is performed on a received bitstream to obtain values of fields for indicating matching relationship parameters, herein the matching relationship parameters are parameters used in a process of constructing predicted values and/or reconstructed values of the pixels in a video image to be decoded.

In Step S904, the values of the fields are mapped to obtain mapped matching relationship parameters.

In Step S906, the predicted values and/or the reconstructed values of the pixels in the video image to be decoded are constructed according to the mapped matching relationship parameters.

By the foregoing steps of inversely mapping the value range of a mapped matching relationship parameters obtained from an entropy coding process and output matching relationship parameters before the mapping, it is to address the problem existing in the conventional art which is caused by the direct implementation of entropy coding for matching relationship parameters and achieve a good data compression performance through entropy coding.

In an alternative embodiment, the frequency of the mapped value of a matching relationship parameter reduces as the mapped value of the matching relationship parameter increases, herein the frequency indicates that the greater the mapped value is, the less the probability of the actual appearance of the mapped value is, that is, the less the mapped value appears.

In an alternative embodiment, mapping is performed on the values of the fields in Step S904 to obtain mapped matching relationship parameters, according to the obtained matching relationship parameters, convert the values of the fields, and take the values obtained after conversion as the mapped matching relationship parameters. In another alternative embodiment, the fields to be processed of the same type are assembled and/or rearranged into an array according to a specific rule, and then the array is processed to be used as the mapped matching relationship parameters.

In an alternative embodiment, the specific rule includes at least one of the following rules: a preset rule; and an operation which is set according to the obtained values of the fields for assembling and/or rearranging the values of the field to be processed.

Alternatively, in an alternative embodiment, the above mentioned array is processed using a method of taking the values of the fields to be processed in the array as output values after the processing or a method of converting the values of the fields to be processed in the array and taking the values obtained from the conversion as output values after the processing.

An image decoding apparatus is also provided in the embodiment to realize the foregoing embodiments and preferred implementations, and what has been described above is not described here repeatedly. The term 'module', as used hereinafter, is the combination of software and/or hardware for realizing predetermined functions. Although the apparatuses described in the following embodiments are preferably implemented as software, the implementation of the apparatuses as hardware or combination of software and hardware may also be conceived.

Figure 10:
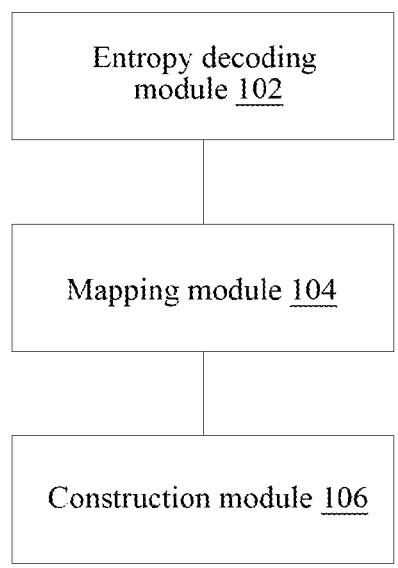
FIG. 10 is a block diagram (2) illustrating the structure of an image decoding apparatus according to an embodiment of the present document.

FIG. 10 is a block diagram (2) illustrating the structure of an image decoding apparatus according to an embodiment of the present document. As shown in FIG. 10, the apparatus includes: an entropy decoding module 102 arranged to perform entropy decoding on a received bitstream to obtain values of fields for indicating matching relationship parameters, herein the matching relationship parameters are parameters used in a process of constructing predicted values and/or reconstructed values of pixels in an image to be decoded; a mapping module 104 arranged to map the values of the fields to obtain mapped matching relationship parameters; and a construction module 106 arranged to construct the predicted values and/or the reconstructed values of the pixels in the image to be decoded according to the mapped matching relationship parameters.

The foregoing problem existing in the conventional art will be described below with reference to an exemplary alternative embodiment, and the foregoing alternative embodiments and the alternative implementations thereof are combined in the alternative embodiment described below.

The major technical feature of the alternative embodiment lies in that bi-directional single mapping (referred to as a bijection for short) is performed on the value range of a matching relationship parameter before entropy coding is implemented for the matching relationship parameter to map a value with a relatively high frequency in the value range into a relatively small value and a value with a relatively low frequency in the value range into a relatively large value. Bijection is also called one-to-one surjection. A bijection has an inverse mapping which is also a one-to-one surjection.

Figure 11:
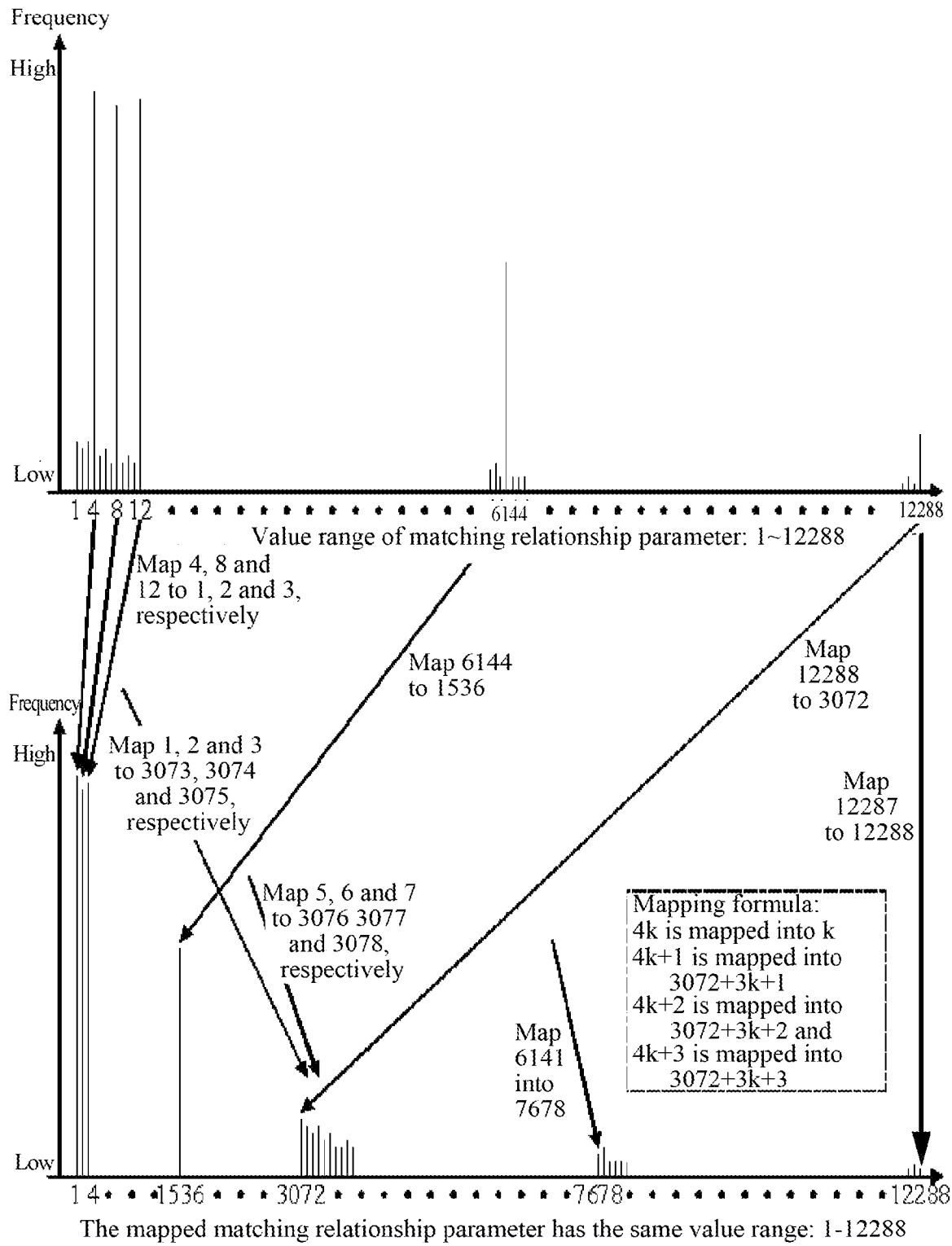
FIG. 11 is a schematic diagram illustrating a bi-directional single mapping in the value range of a matching relationship parameter according to an embodiment of the present document.

FIG. 11 is a schematic diagram illustrating a bi-directional single mapping in the value range of a matching relationship parameter according to an embodiment of the present document, and as shown in FIG. 11, the value range of a certain matching relationship parameter is an integer interval from 1 to 12288, represented as [1,12288]. The feature of the frequency of the matching relationship parameter is that the frequency for multiples of 4 (that is, 4, 8, 12, . . . , 6144, . . . , 12288) is much higher than that of multiples of integers which are not 4. Multiples of 4 are mapped to integers from 1 to 3072, while integers which are not 4 are mapped to integers from 3073 to 12288, so that the frequency of the mapped matching relationship parameter presents an overall trend that the higher the value of the mapped matching relationship parameter, the lower the frequency of the mapped matching relationship parameter is, thus significantly improving the compression efficiency of the subsequent entropy coding. The mapping formula shown in FIG. 11 is described below:

4k is mapped to k, in which k=1, 2, 3, 4, . . . 3072;

4k+1 is mapped to 3072+3k+1, in which k=0, 1, 2, 3, . . . 3071;

4k+2 is mapped to 3072+3k+2, in which k=0, 1, 2, 3, . . . 3071; and

4k+3 is mapped to 3072+3k+3, in which k=0, 1, 2, 3, . . . 3071.

The mapping is a self-bijection ranging from the integer interval [1, 12288] to the integer interval [1, 12288], and the inverse mapping formula of the mapping is described below:

k is mapped to 4k, in which k=1, 2, 3, 4, . . . 3072;

3072+3k+1 is mapped to 4k+1, in which k=0, 1, 2, 3, . . . 3071;

3072+3k+2 is mapped to 4k+2, in which k=0, 1, 2, 3, . . . 3071; and

3072+3k+3 is mapped to 4k+3, in which k=0, 1, 2, 3, . . . 3071.

The inverse mapping is also a self-bijection ranging from the integer interval [1, 12288] to the integer interval [1, 12288].

The most basic specific technical feature of the coding apparatus provided in an alternative embodiment of the present document lies in that mapping is performed on the value range of matching relationship parameters generated from matching coding first, thus there is an overall trend that the frequency values of the mapped matching relationship parameters reduces as the values of the mapped matching relationship parameters increases, and then entropy coding is performed on the mapped matching relationship parameters.

The most basic specific technical feature of the decoding apparatus provided in an alternative embodiment of the present document lies in that inverse mapping is performed on the value range of matching relationship parameters obtained from entropy decoding first (actually, mapped matching relationship parameters) to obtain real matching relationship parameters, and then matching decoding is conducted using the matching relationship parameters.

Figure 12:
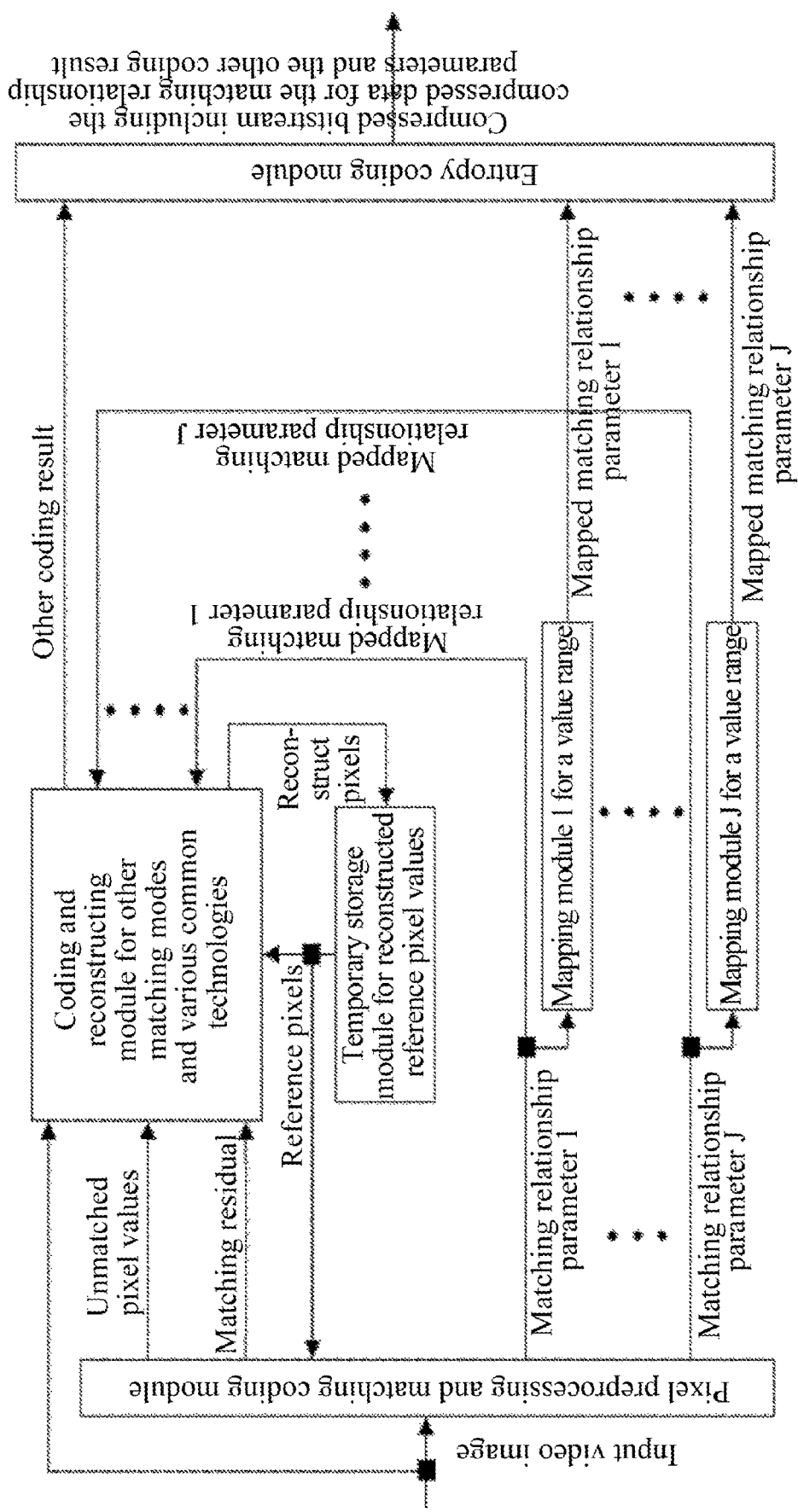
FIG. 12 is a schematic diagram illustrating the modules of a coding apparatus according to an embodiment of the present document.

FIG. 12 is a schematic diagram illustrating the modules of a coding apparatus according to an embodiment of the present document; and as shown in FIG. 12, the whole coding apparatus is consisted of the following modules.

1) A pixel preprocessing and matching coding module, arranged to perform pixel preprocessing and matching coding on pixel values of an input video image to generate and output one or more matching relationship parameters (marked as a matching relationship parameter 1, a matching relationship parameter 2 . . . a matching relationship parameter J respectively) and other matching coding result. Examples of the pixel preprocessing include: sample quantization, color quantization, color-based pixel clustering and the representation of the color of an input original pixel with a color palette and an index; examples of the matching coding include: block matching, micro block matching, micro block string matching, fine division matching, string matching, color palette-index matching, 2-dimensional shape-preserving matching, quadtree matching and arbitrary shape and area copy matching; examples of the matching relationship parameters include: matching position, displacement vector, a component of a displacement vector, matching distance, matching size, matching length, a height of a matching rectangle, a width of a matching rectangle, a group of parameters defining a specific matching region, and the numbers of a plurality of preset matching shapes and sizes, herein the value range of a matching relationship parameter is a preset finite element set in which numerals are arranged in a certain order, for example, a finite element subset consisting of integers arranged in ascending order; and examples of the other matching coding result include: matching residual and unmatched pixel values.

2) A mapping module for a value range of a matching relationship parameter, arranged to perform bi-directional single mapping on a value range of the matching relationship parameters, herein input of the mapping is the matching relationship parameters output by the module 1), through the mapping, mapped matching relationship parameters are generated and output, and the purpose of the mapping is to map a value of relatively high frequency in the value range into a relatively small value, and a value of relatively low frequency in the value range into a relatively large value; bi-directional single mapping, that is, a one-to-one surjection, is referred to as bijection for short, a bijection has an inverse mapping which is also a one-to-one surjection; each matching relationship parameter has its own mapping; and mapping modules for a matching relationship parameter 1, a matching relationship parameter 2 . . . a matching relationship parameter J are marked as a mapping module 1 for a value range, a mapping module 2 for a value range . . . and a mapping module J for a value range, respectively; the mappings of some matching relationship parameters may be identity mappings (each value in the value range is mapped to the value itself), however, at least one mapping of one matching relationship parameter is not an identity mapping; the mapping relationship of the mapping (that is, the relationship between the input of the mapping and the output of the mapping, or which input value is mapped to which output value) may be a preset static mapping relationship, or the mapping relationship may be adjusted dynamically according to the real-time statistic characteristic of various values of the input matching relationship parameters (e.g. the frequency at which the value appears till the current moment).

3) A coding and reconstructing module for other matching modes and various common technologies, arranged to perform coding and reconstruction operations of other matching modes and various common technologies, for example, intra prediction, inter prediction, conversion, quantization, inverse conversion, inverse quantization, offset corresponding to prediction residual and matching residual (that is, inverse operation of residual calculation operation), DPCM, first-order difference and higher-order difference, mapping, run, index, deblocking filter and sample adaptive offset, on the input video image, various parameters and variables. Other matching modes refer to matching modes different from those adopted in the module 1), the input of the present module is the output from the module 1), reference pixel values and the original pixel values of the input video image, and the output from the present module is reconstructed pixel values and other coding result; the reconstructed pixel values are placed in a temporary storage module for reconstructed reference pixel values as reference pixel values needed for the subsequent matching coding operations and the coding and reconstruction operations of other matching modes and various common technologies.

4) A temporary storage module for reconstructed reference pixel values, arranged to temporarily store pixel values in a reconstructed reference pixel value set, that is, the reconstructed pixel values ended at a start of the CU in current decoding or the matching region (or a matching string or a matching block) in current decoding during a coding process, used as reference pixel values for the current and the subsequent matching coding, and as reference pixel values needed for performing coding and reconstruction operations of other matching modes and various common technologies on current and subsequent CUs.

5) An entropy coding module, arranged to implement entropy coding for all the coding results that need to be output to a compressed bitstream, herein the coding results include the mapped matching relationship parameters and the other coding result, and the result of the entropy coding, that is, a compressed bitstream including the compressed data of the matching relationship parameters and the other coding result, is also the final output of the coding apparatus.

Figure 13:
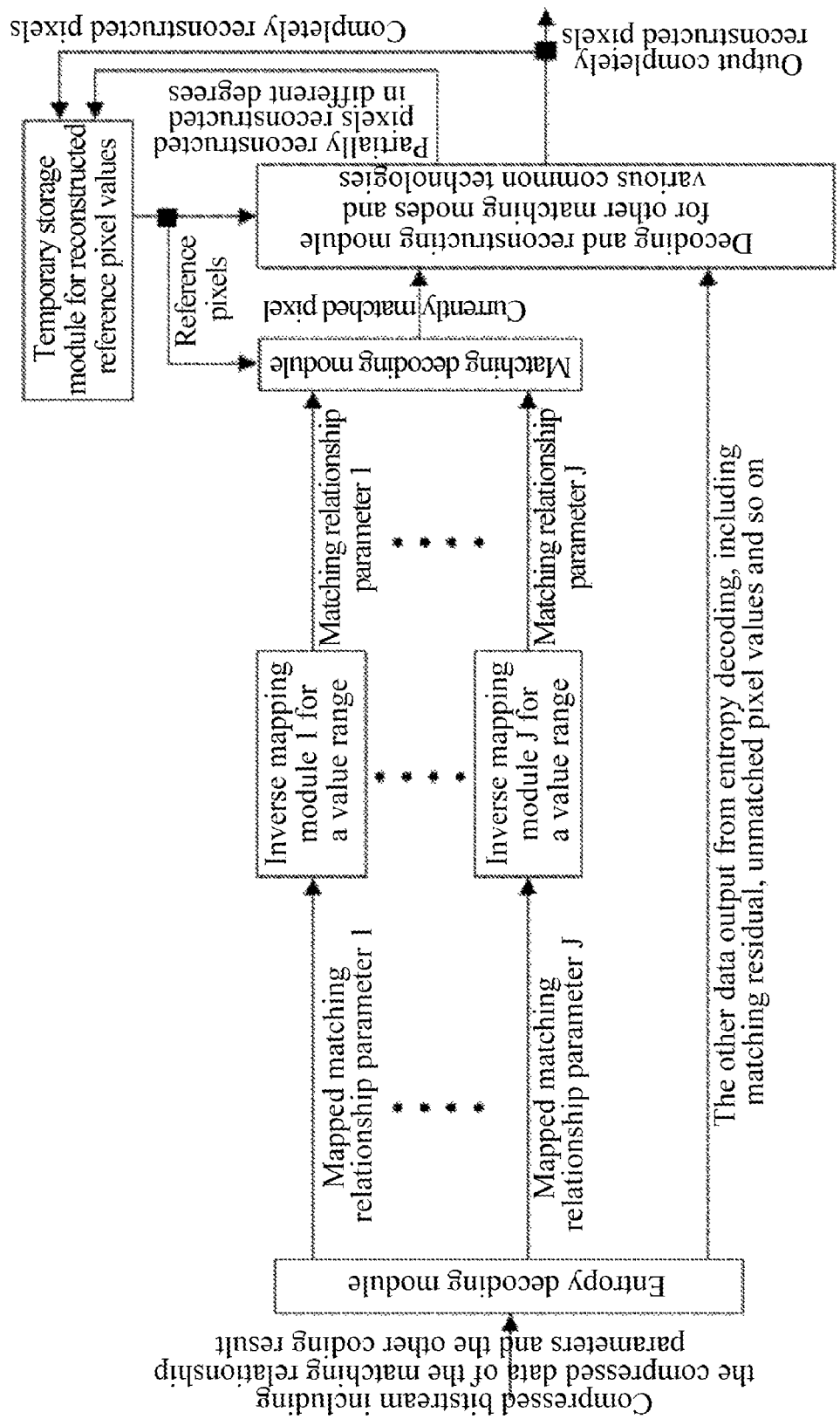
FIG. 13 is a schematic diagram illustrating the modules of a decoding apparatus according to an embodiment of the present document.

FIG. 13 is a schematic diagram illustrating the modules of a decoding apparatus according to an embodiment of the present document. As shown in FIG. 13, the whole decoding apparatus is consisted of the following modules.

1) An entropy decoding module, arranged to perform entropy decoding on an input compressed bitstream including compressed data of a matching relationship parameters and other coding result to parse the meanings of the various data obtained from the entropy decoding; map one or more mapped matching relationship parameters (marked as a mapped matching relationship parameter 1, a mapped matching relationship parameter 2 . . . a mapped matching relationship parameter J respectively) obtained after the parsing process to an inverse mapping module for a value range; output other data and other matching coding results such as matching residual and unmatched pixel values obtained from the parsing process to a decoding and reconstructing module for other matching modes and various common technologies, herein the value range of the mapped matching relationship parameters is a preset finite element set in which numerals are arranged in a certain order, for example, a finite element set in which integers are arranged in ascending order.

2) An inverse mapping module for a value range of matching relationship parameters, arranged to perform the inverse mapping of a bi-directional single mapping on the value range of mapped matching relationship parameters, herein the input of the inverse mapping is the mapped matching relationship parameters parsed and output from the module 1), through the inverse mapping, the matching relationship parameters existing prior to the mapping (that is, the matching relationship parameters on which the mapping is not implemented in the coding apparatus) are restored and output; each matching relationship parameter has its own inverse mapping; and inverse mapping modules for a matching relationship parameter 1, a matching relationship parameter 2 . . . a matching relationship parameter J are marked as an inverse mapping module 1 for a value range, an inverse mapping module 2 for a value range . . . an inverse mapping module J for a value range, respectively; the inverse mappings of some matching relationship parameters may be identity mappings (each value in the value range is mapped to the value itself), however, at least one inverse mapping of one matching relationship parameter may not be identity mapping; the inverse mapping relationship of the inverse mapping (that is, the relationship between the input of the inverse mapping and the output of the inverse mapping, or which input value is inversely mapped to which output value) may be a preset static inverse mapping relationship, or the inverse mapping relationship may be adjusted dynamically according to the real-time statistic feature of various values of the matching relationship parameters (e.g. the frequency at which the value appears till the current moment); examples of the matching relationship parameters include: matching position, displacement vector, a component of a displacement vector, matching distance, matching size, matching length, a height of a matching rectangle, a width of a matching rectangle, a group of parameters defining a specific matching region, and the numbers of a plurality of preset matching shapes and sizes.

3) A matching decoding module arranged to perform matching decoding operations on the matching relationship parameters, herein the input of the module is the matching relationship parameters output from the module 2; and examples of the matching decoding include: block matching, micro block matching, micro block string matching, fine division matching, string matching, color palette-index matching, 2-dimensional shape-preserving matching, quadtree matching and arbitrary shape and area copy matching; in the matching decoding operations, firstly, the position of a matching reference pixel value in the temporary module for reconstructed reference pixel values and the shape and the size of a matching region consisting of matching reference pixel values (the matching region may also be a matching string or matching block) are determined, then the matching reference pixel values in the matching region of the shape and the size are copied from the position, and the matching reference pixel values are copied to the position of the currently matched pixel value in current decoding to reconstruct the currently matched pixel values, herein the output of the present module is all the currently matched pixel values reconstructed.

4) A decoding and reconstructing module for other matching modes and various common technologies, arranged to perform decoding and reconstruction operations of other matching modes and various common technologies, for example, intra prediction, inter prediction, inverse conversion, inverse conversion, offset corresponding to prediction residual and matching residual (that is, the inverse operation of residual calculation operation), DPCM, first-order difference and higher-order difference, mapping, run, index, deblocking filter, and sample adaptive offset, on various parameters and variables of the matching region (the matching region may also be a matching string or a matching block) in current decoding or the CU in current decoding; the other matching modes refer to matching modes different from those adopted in the module 3), and the output from the module is reconstructed pixel values (including completely reconstructed pixel values and partially reconstructed pixel values that are reconstructed in different degrees); the reconstructed pixel values are placed in a temporary storage module for reconstructed reference pixel values as reference pixel values needed for the subsequent matching coding operations, the decoding and reconstruction operations in other matching modes and various common technologies; and the completely reconstructed pixel values are also the final output of the decoding apparatus.

5) A temporary storage module for reconstructed reference pixel values, arranged to temporarily store the pixel values in a reconstructed reference pixel value set, that is, the reconstructed pixel values ended at a start of the CU in current decoding or the matching region (the matching region may also a matching string or a matching block) in current decoding during a coding process, used as reference pixel values for the current and the subsequent matching decoding, and as reference pixel values needed for performing the decoding and reconstruction operation in other matching modes and various common technologies on the current and the subsequent CUs.

Alternative embodiments of the present document are applicable to coding and decoding an image or a CU in a packed format. Alternative embodiments of the present document are also applicable to coding and decoding an image or a CU in a component planar format. Alternative embodiments of the present document are applicable to lossless matching coding and decoding. Embodiments of the present document are also applicable to lossy matching coding and decoding. Embodiments of the present document are applicable to lossless coding and decoding. Embodiments of the present document are also applicable to lossy coding and decoding. Alternative embodiments of the present document are also applicable to coding and decoding using a plurality of matching modes simultaneously (for example, using three following matching modes: block matching, arbitrary shape region copy matching and color palette-index matching simultaneously, or three following matching modes: block matching, palette-index matching and string matching simultaneously).

The accompanying drawings provided above explicate, by way of illustration only, the basic concept and operations of embodiments of the present document only these components which are directly related to embodiments of the present document are shown in the accompanying drawings, and these components are not drawn according to the number, the shapes or the sizes of the components in practical implementation, and the forms, the number and the scales of various components in practical implementation can be changed optionally, moreover, the layout of the components may be more complicated.

More implementation details and variations of alternative embodiments of the present document are described below.

Embodiment 1 for the Mapping of the Value Range of Matching Relationship Parameters The value range is divided into K (generally, 1<K<20) subordinate value ranges, and accordingly, the mapping and/or the inverse mapping is divided into corresponding mapping or inverse mapping in the K subordinate value ranges.

Embodiment 2 for the Mapping of the Value Range of a Matching Relationship Parameters The value range is divided into L (generally, 1<L<40) groups of subordinate value ranges, each subordinate value range in each group of subordinate value ranges includes equal finite elements, and accordingly, the mapping or the inverse mapping is divided into L groups of mappings and/or inverse mappings. Through each group of mappings and/or inverse mappings, a complete subordinate value range in a group of subordinate value ranges is mapped or inversely mapped into a complete subordinate value range (which can be the same subordinate value range or another one) in the same group, while keeping a order of all elements in the subordinate value range unchanged, that is, if an element A is located in front of an element B, after the mapping, the element A is still located in front of the element B, or after the inverse mapping, the element A is still located in front of the element B, or vice versa.

Embodiment 3 for the Mapping of the Value Range of Matching Relationship Parameters One of the mappings or the inverse mappings in the value range and/or the subordinate value range are consisted of a plurality of (generally, not less than 4) partial mappings and/or partial inverse mappings that are implemented successively.

Embodiment 4 for the Mapping of the Value Range of Matching Relationship Parameters The mapping/inverse mapping relationships for one of the mappings/inverse mappings (or the partial mappings/inverse mappings) in the value range or the subordinate value range are represented in one of the following ways: the mapping relationships and/or the inverse mapping relationships are all represented by one computation expression or a group of computation expressions; or the mapping relationships and/or the inverse mapping relationships are all represented by a list; a part of the mapping relationships and/or a part of the inverse mapping relationships are represented by one computation expression or a group of computation expressions while the others are represented by a list.

Embodiment 5 for the Mapping of the Value Range of Matching Relationship Parameters The mapping relationship and/or the inverse mapping relationship of one of the foregoing mappings (or the foregoing partial mappings) and/or the foregoing inverse mappings (or the foregoing partial inverse mappings) in the value range or the subordinate value range change as the status and/or parameters of current coding (decoding) change.

Embodiment 6 for the Mapping of the Value Range of Matching Relationship Parameters The mapping relationship and/or the inverse mapping relationship of one of the mappings (or the foregoing partial mappings) and/or the foregoing inverse mappings (or the foregoing partial inverse mappings) in the value range or the subordinate value range change as the width of the current CU changes, that is, when a width of a current CU is a value, a mapping relationship and/or an inverse mapping relationship are used; when a width of a current CU is another value, another mapping relationship and/or inverse mapping relationship are used, for example, if the width of the current CU is W, the frequencies of a plurality of or all the multiples of the value W of a certain matching relationship parameter (e.g. a matching distance) are much greater than those of a plurality of or all the multiples of values different from W, then it is needed to map the plurality of or all the multiples of the value W to values in a smaller value range and those of the values different from W to values in a bigger value range so that the mapping relationship is related to W, as a result, when the W changes, the mapping relationship changes, and so does the inverse mapping relationship.

Embodiment 7 for the Mapping of the Value Range of Matching Relationship Parameters As a special case of embodiment 6, in this embodiment, one of the matching relationship parameters is a matching distance, and the width W of the current CU has four values: 64, 32, 16 and 8, and accordingly, the mapping or the inverse mapping has four mapping relationships and/or four inverse mapping relationships.

Embodiment 8 for the Mapping of the Value Range of Matching Relationship Parameters Apart from the foregoing modules, there is further a real-time statistic module for various values in the value range of matching relationship parameters, arranged to make real-time statistics on the characteristics of various values, for example, the frequency at which each of the values appears till the current moment; and dynamically adjust the mapping relationship of the foregoing mapping (or the foregoing partial mapping) and/or the inverse mapping relationship of the inverse mapping (or the partial inverse mapping) according to the result of the real-time statistics on the various values of the matching relationship parameters.

In conclusion, the image coding and decoding methods and apparatus proposed in the embodiments of the present document improve image compression performance.

In still another embodiment, software is also provided which is used for executing the foregoing embodiments and the technical solutions described in the foregoing embodiments.

In still another embodiment, a storage medium is also provided in which the foregoing software is stored, including, but not limited to an optical disk, a floppy disk, a hard disk and erasable memory etc.

Apparently, it should be appreciated by those skilled in the art that each module or each step described in the present document can be realized by a universal computing device and that the modules or steps may be integrated on a single computing device or distributed on a network consisting of a plurality of computing devices, alternatively, the modules or steps may be realized with program codes executable by a computing device, so that the modules or steps can be stored in a storage to be executed by a computing device. In some cases, the steps shown or described herein can be executed in a sequence different from here, or the modules or steps are formed into various integrated circuit modules, or several of the modules or steps therein are formed into a single integrated circuit module. Therefore, the present document is not limited to any specific combination of hardware and software.

The above description is only alternative embodiments of the present document, and is not used for limiting the present document. For those skilled in the art, there can be a variety of modifications and variations. Any modification, equivalent substitute and improvement made within the essence and principle of the present document shall fall within the protection scope of the present document.

INDUSTRIAL APPLICABILITY

The present document relates to the compression coding and decoding of digital videos and provides an image coding and decoding method and apparatus, herein the image coding method includes: performing matching coding on pixels of an input video image to obtain one or more matching relationship parameters, herein the matching relationship parameters are parameter used in a process of constructing predicted values and/or reconstructed values of the pixels in image; mapping the matching relationship parameters to obtain mapped value of the matching relationship parameters; and performing entropy coding on the mapped value of the matching relationship parameters. The present document addresses the problem existing in the conventional art which is caused by the direct implementation of entropy coding for matching relationship parameters and achieves a good data compression performance through entropy coding.

What is claimed is:

1. An image coding method, comprising:
performing matching coding on pixels of an input video image to obtain one or more matching relationship parameters, wherein the matching relationship parameters are parameters used in a process of constructing predicted values and/or reconstructed values of the pixels in the input video image;
mapping the matching relationship parameter to obtain a mapped value of the matching relationship parameter, wherein a value range of the matching relationship parameter is divided into K subordinate value ranges, and accordingly, the mapping is divided into mappings in the K subordinate value ranges, and wherein a mapping relationship for one of the mappings or partial mappings in the value range or the subordinate value range changes as status and/or parameters of current coding change; and
performing entropy coding on the mapped value of the matching relationship parameter, wherein
mapping the matching relationship parameters to obtain a mapped value of the matching relationship parameter includes:
converting, according to existing matching relationship parameters, matching relationship parameters to be matched, and taking values obtained after the conversion as the mapped values of the relationship parameters to be matched, wherein a value with a relatively high frequency in the value range of the matching relationship parameter is mapped into a relatively small value and a value with a relatively low frequency in the value range of the matching relationship parameter is mapped into a relatively large value; and/or
assembling and/or rearranging matching relationship parameters of a same type into a matching relationship parameter group according to a specific rule, mapping the matching relationship parameter group, and taking the matching relationship parameter group obtained after the mapping as the mapped values of the matching relationship parameters.

2. The method according to claim 1, wherein the specific rule includes at least one of the following rules:
   a preset rule; and
   an operation which is set according to a value of the existing matching relationship parameter for assembling and/or rearranging a plurality of relationship parameters to be matched.

3. The method according to claim 1, wherein mapping the matching relationship parameter group comprises:
   taking values of the matching relationship parameters in the matching relationship parameter group as an output of the mapping; and/or
   taking values obtained after converting the values of the matching relationship parameters in the matching relationship parameter group as an output of the mapping.

4. An image decoding method, comprising:
   performing entropy decoding on a received bitstream to obtain values of fields for indicating matching relationship parameters, wherein the matching relationship parameters are parameters used in a process of constructing predicted values and/or reconstructed values of pixels in a video image to be decoded;
   mapping the values of the fields to obtain mapped matching relationship parameters, wherein a value range of the matching relationship parameter is divided into K subordinate value ranges, and accordingly, the mapping is divided into mappings in the K subordinate value ranges, and wherein a mapping relationship for one of the mappings or partial mappings in the value range or the subordinate value range changes as status and/or parameters of current coding change; and
   constructing the predicted values and/or the reconstructed values of the pixels in the video image to be decoded according to the mapped matching relationship parameters, wherein
   mapping the values of the fields to obtain the mapped matching relationship parameters includes:
   converting, according to the obtained matching relationship parameters, the values of the fields to be processed, and taking values obtained after the conversion as the mapped matching relationship parameters; and/or
   assembling and/or rearranging the values of the fields to be processed of a same type into an array according to a specific rule, and processing the array as the mapped matching relationship parameters.

5. The decoding method according to claim 4, wherein the specific rule includes at least one of the following rules:
   a preset rule; and
   an operation which is set according to the obtained value of the field for assembling and/or rearranging the values of the fields to be processed.

6. The decoding method according to claim 4, wherein processing the array comprises:
   taking the values of the fields to be processed in the array as output values after processing; and/or
   taking the values obtained after converting the values of the fields to be processed in the array as output values after processing.

7. An image coding apparatus, comprising:
   a matching coding module arranged to perform matching coding on pixels of an input video image to obtain one or more matching relationship parameters, wherein the matching relationship parameters are parameters used in a process of constructing predicted values and/or reconstructed values of the pixels in the input video image;
   a mapping module arranged to map the matching relationship parameters to obtain mapped values of the matching relationship parameters, wherein a value range of the matching relationship parameter is divided into K subordinate value ranges, and accordingly, the mapping is divided into mappings in the K subordinate value ranges, and wherein a mapping relationship for one of the mappings or partial mappings in the value range or the subordinate value range changes as status and/or parameters of current coding change; and
   an entropy coding module arranged to perform entropy coding on the mapped values of the matching relationship parameters, wherein
   the mapping module is further arranged to convert, according to existing matching relationship parameters, match relationship parameters to be matched, and take values obtained after the conversion as the mapped values of the relationship parameters to be matched, wherein a value with a relatively high frequency in the value range of the matching relationship parameter is mapped into a relatively small value and a value with a relatively low frequency in the value range of the matching relationship parameter is mapped into a relatively large value; and/or
   assemble and/or rearrange matching relationship parameters of a same type into a matching relationship parameter group according to a specific rule, map the matching relationship parameter group, and take the matching relationship parameter group obtained after the mapping as the mapped values of the matching relationship parameters.

8. An image decoding apparatus, comprising:
   an entropy decoding module arranged to perform entropy decoding on a received bitstream to obtain values of fields for indicating matching relationship parameters, wherein the matching relationship parameters are parameters used in a process of constructing predicted values and/or reconstructed values of pixels in a video image to be decoded;
   a mapping module arranged to map the values of the fields to obtain mapped matching relationship parameters, wherein a value range of the matching relationship parameter is divided into K subordinate value ranges, and accordingly, the mapping is divided into mappings in the K subordinate value ranges, and wherein a mapping relationship for one of the mappings or partial mappings in the value range or the subordinate value range changes as status and/or parameters of current coding change; and
   a construction module arranged to construct the predicted values and/or the reconstructed values of the pixels in the video image to be decoded according to the mapped matching relationship parameters, wherein
   the mapping module is further arranged to convert, according to the obtained matching relationship parameters, the values of the fields to be processed, and take values obtained after the conversion as the mapped matching relationship parameters; and/or
   assemble and/or rearrange the values of the fields to be processed of a same type into an array according to a specific rule, and process the array as the mapped matching relationship parameters.

* * * * *